United States Patent [19]
Heitkamp et al.

[11] 4,060,992
[45] Dec. 6, 1977

[54] METHOD OF AND APPARATUS FOR LAYING A PIPE-LINE

[75] Inventors: Herbert Heitkamp, Lutkeheide; Heinz Hüsemann, Grevinghof, both of Germany

[73] Assignee: Gewerkschaft Eisenhutte Westfalia, Altluenen, Germany

[21] Appl. No.: 682,065

[22] Filed: Apr. 30, 1976

[30] Foreign Application Priority Data

Apr. 30, 1975 Germany .............................. 2519210

[51] Int. Cl.² ............................................. E02D 5/02
[52] U.S. Cl. ...................................... 61/41 A; 61/85; 61/105
[58] Field of Search .................... 61/41 A, 84, 85, 63, 61/42, 45 R, 105

[56] References Cited
U.S. PATENT DOCUMENTS

| 1,948,707 | 2/1934 | Gilman | 61/85 |
| 3,204,415 | 9/1965 | Hill et al. | 61/85 X |
| 3,427,813 | 2/1969 | Hayes | 61/85 |
| 3,468,133 | 9/1969 | Matsushita | 61/85 |
| 3,578,809 | 5/1971 | Cunningham | 61/85 X |
| 3,864,925 | 2/1975 | Foik | 61/85 X |
| 3,903,707 | 9/1975 | Foik | 61/85 |
| 3,916,629 | 11/1975 | Thompson | 61/41 A |
| 3,967,454 | 7/1976 | Barnes | 61/41 A |

Primary Examiner—Dennis L. Taylor
Attorney, Agent, or Firm—Thompson, Birch, Gauthier & Samuels

[57] ABSTRACT

Apparatus for laying down a pipe-line in an open trench employs an advanceable shield with elongate parallel cutter planks contacting the floor and side walls of the trench. The planks are supported by a frame which is connected through hydraulic rams to a second rear frame. Means is provided to selectively lock each plank to the rear frame and the rams are operated to advance the shield and the trench. Individual pipe sections are laid end-to-end in the trench behind the rear frame and elongate thrust devices, which can be stowed in an inoperative position, are connected with the rear frame. These thrust devices are designed to engage on the free end of the pipe section last introduced into the trench and the rams are operated to move the rear frame so that the thrust device impart thrust to the pipe sections to effect their interconnection.

11 Claims, 5 Drawing Figures

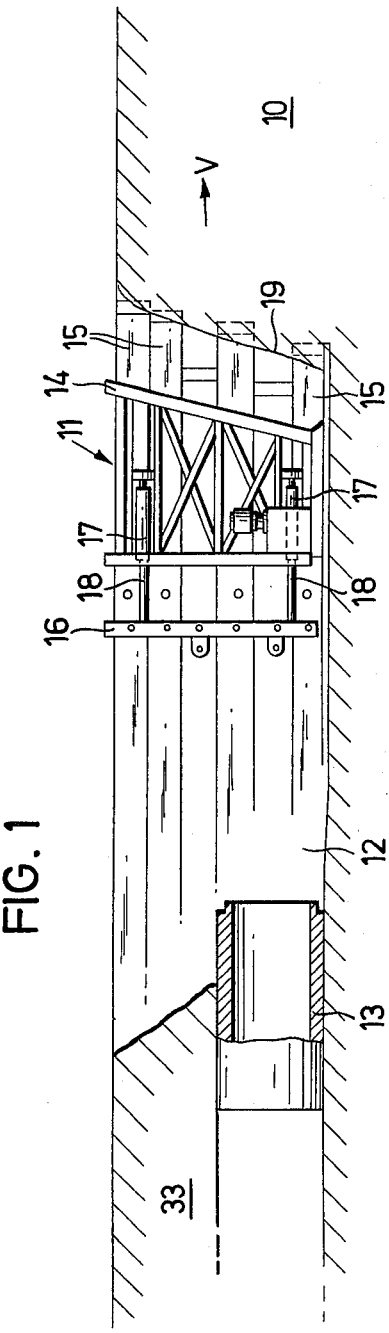
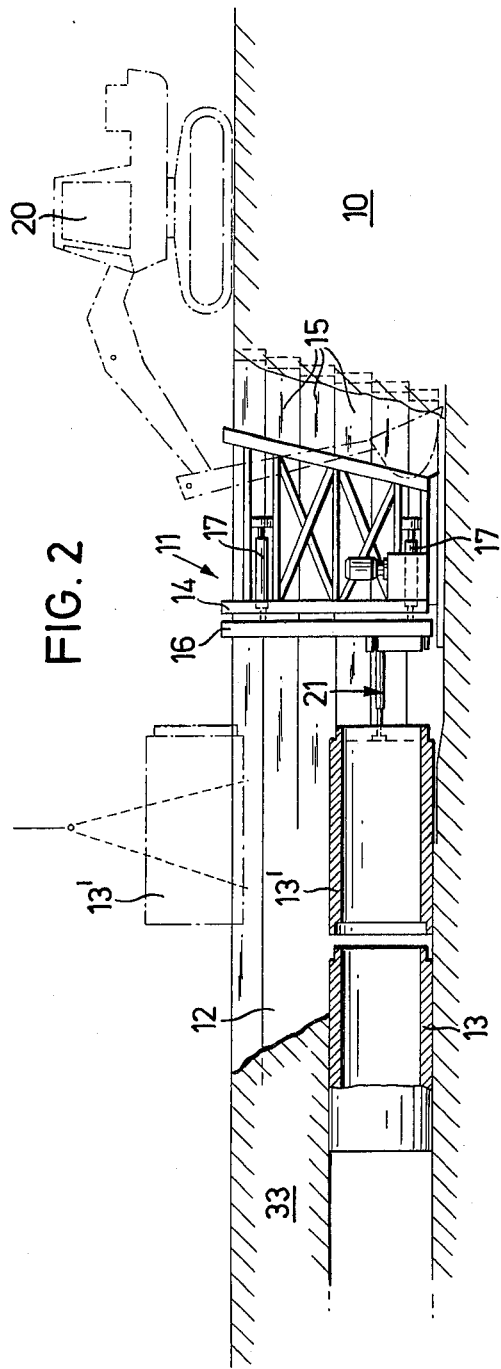

METHOD OF AND APPARATUS FOR LAYING A PIPE-LINE

BACKGROUND OF THE INVENTION

The present invention relates to a method of, and an apparatus for, laying a pipe-line composed of pipe sections arranged end-to-end.

In the construction of a pipe-line, used for conveying water or sewerage, for example, it is known to form an open trench for receiving individual pipe sections which are connected up end-to-end. To support the walls of the trench it is known to use a crib framework. One type of crib framework is an advanceable shield composed, for example, of cutter planks which are movable individually or in groups to penetrate a working face at one end of the trench. The individual pipe sections are then lowered into the open trench and are connected to one another separately. There is a need for an improved method and apparatus for laying a pipe line and a general object of this invention is to provide such a method and apparatus.

SUMMARY OF THE INVENTION

In one aspect the invention provides a method of laying a pipe-line composed of pipe sections arranged end-to-end; said method comprising utilizing an advanceable shield to excavate an open trench for receiving the individual pipe sections by operating hydraulic power means to shift a framework of the shield supporting the walls of the trench and joining the pipe sections together with the aid of thrust means coupled to the framework and by operating the hydraulic power means.

In another aspect the invention provides an apparatus for use in laying a pipe-line composed of pipe sections arranged end-to-end; said apparatus comprising an advanceable shield for use in excavating an open trench for receiving the individual pipe sections, the shield having a framework for supporting the walls of the trench and hydraulic power means for moving the framework; and thrust means coupled to the framework and adapted to urge the pipe sections together under the action of the hydraulic means. The invention also provides an apparatus for use in laying a pipe-line composed of pipe sections arranged end-to-end; said apparatus comprising an advanceable shield for use in excavating an open trench for receiving the individual pipe sections, the shield having a plurality of elongate members for supporting the walls of the trench, a movable frame, hydraulic power means for moving the frame whereby the elongate members may be selectively connected to the frame so as to be shifted therewith; and thrust means coupled to the frame and capable of urging the pipe sections together under the action of the hydraulic means. In accordance with the invention, the movable frame used to advance the elongate members, which may be cutter planks, is also used to apply thrust force to join up the pipe sections installed in the trench rearwardly of the shield. Thus the apparatus can be quite compact and simple. An apparatus made in accordance with the invention can also serve to center and orientate the pipe sections and this is especially helpful where heavy concrete pipe sections are employed.

The shield may have two frames; one supporting the elongate members, e.g., cutter planks, and the other being selectively connectible to individual members or groups of members. The hydraulic power means, which can be a number of piston and cylinder units is then operated to advance the shield so as to effect relative movement between the frames with the other frame being coupled to one or more elongate members. When it is desired to join a newly installed pipe section lowered into the trench behind the shield to the previously installed pipe section the hydraulic power means would be operated to move the other frame — now entirely detached from the elongate members — to cause the thrust means to now exert force on the free end of the newly installed pipe section. Such force can not only connect the pipe sections together but also serve to locate and centralize the, newly installed pipe section in relation to the pipe line.

The thrust means can take the form of several, and preferably two, elongate devices engageable directly on the free end of the pipe section.

In order to facilitate the movement of the pipe section, especially where the latter is relatively heavy, it is desirable to have the thrust devices engage on the free end of the pipe section at positions disposed above the floor of the trench and below the longitudinal axis of the pipe section. To preclude damage to the pipe section head pieces engaging over an adequate area of the pipe section end, and at least partly yieldable or resilient can be provided at the ends of the thrust device. To preclude damage to the thrust devices themselves shear pins can connect separate parts thereof. By making these parts telescopic the thrust devices can be adjustable in length.

It is also desirable to arrange for the thrust devices to be moved between an operative position and a stowed inoperative position. This latter position may be where the devices are located alongside the trench walls for example thus enabling the pipe section to be introduced into the trench without hindrance and without damaging the devices. The devices may pivot on the frame between the respective positions and detachable locking means such as pins can be used to retain the devices in the operative or working position. When it is desired to place the devices in the stowed position the locking means can be removed to permit the devices to be swung outwards to the stowed position. In one specific constructional form each thrust device is provided with a structure with two perpendicular arms an upper one of which is pivotably connected to the frame about a vertical pivot axis and the lower one of which is securable to the frame with a detachable locking pin.

The invention may be understood more readily, and various other features of the invention may become apparent, from consideration of the following description.

BRIEF DESCRIPTION OF DRAWINGS

An embodiment of the invention will now be described, by way of example only, with reference to the accompanying drawings, wherein:

FIG. 1 is a schematic part sectional side view of apparatus made in accordance with the invention used for laying a pipe line;

FIG. 2 is a view corresponding to FIG. 1 and depicting a different operating stage in the pipe-line laying operation;

DESCRIPTION OF PREFERRED EMBODIMENT

Figure 3:
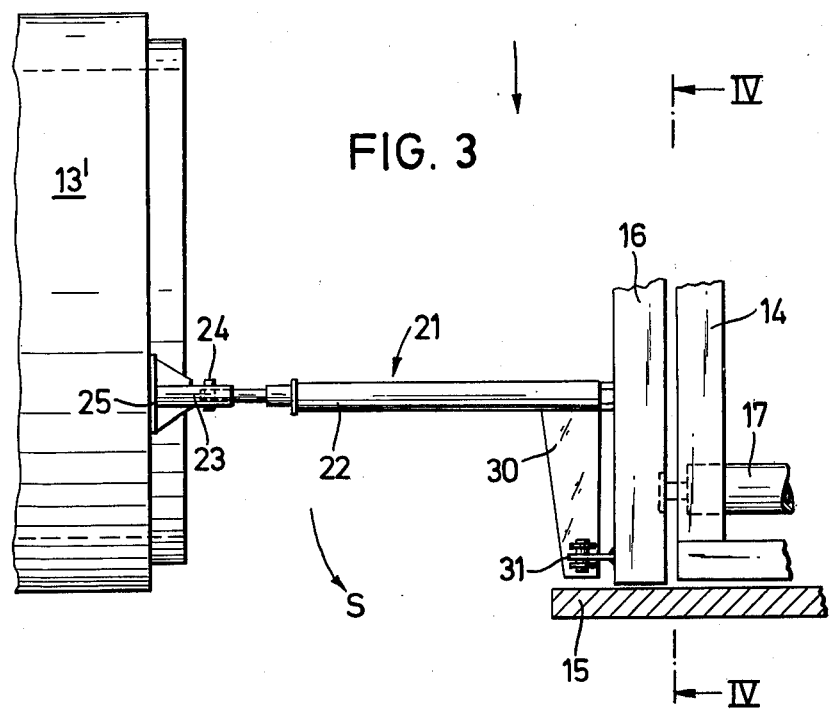
FIG. 3 is a schematic side view of part of the apparatus on a somewhat larger scale.
Figure 4:
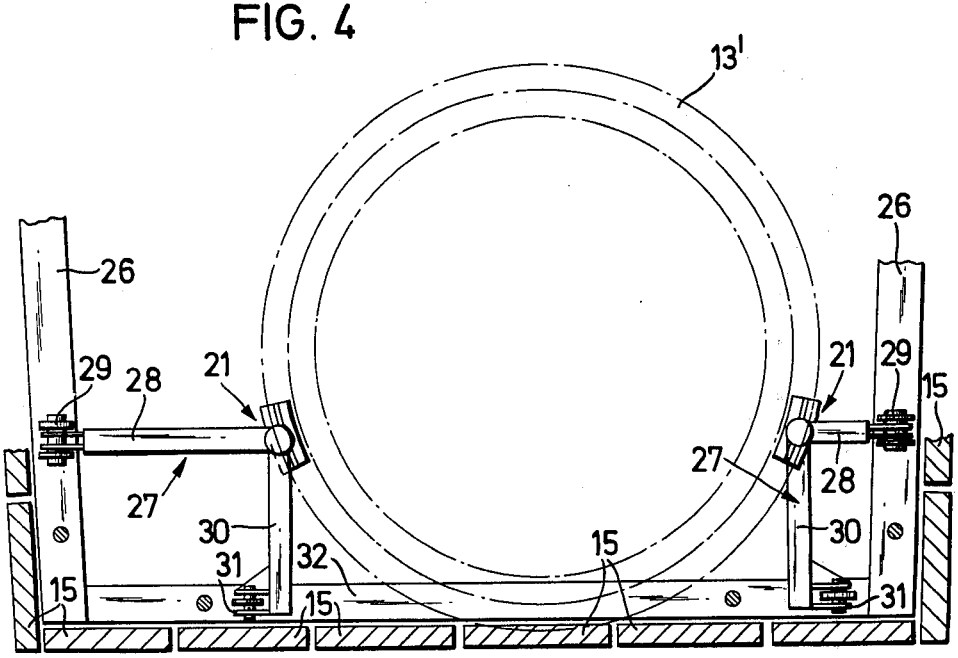
FIG. 4 is a sectional end view of the part of the apparatus represented in FIG. 3, the view being taken along the line IV-IV of FIG. 3.
Figure 5:
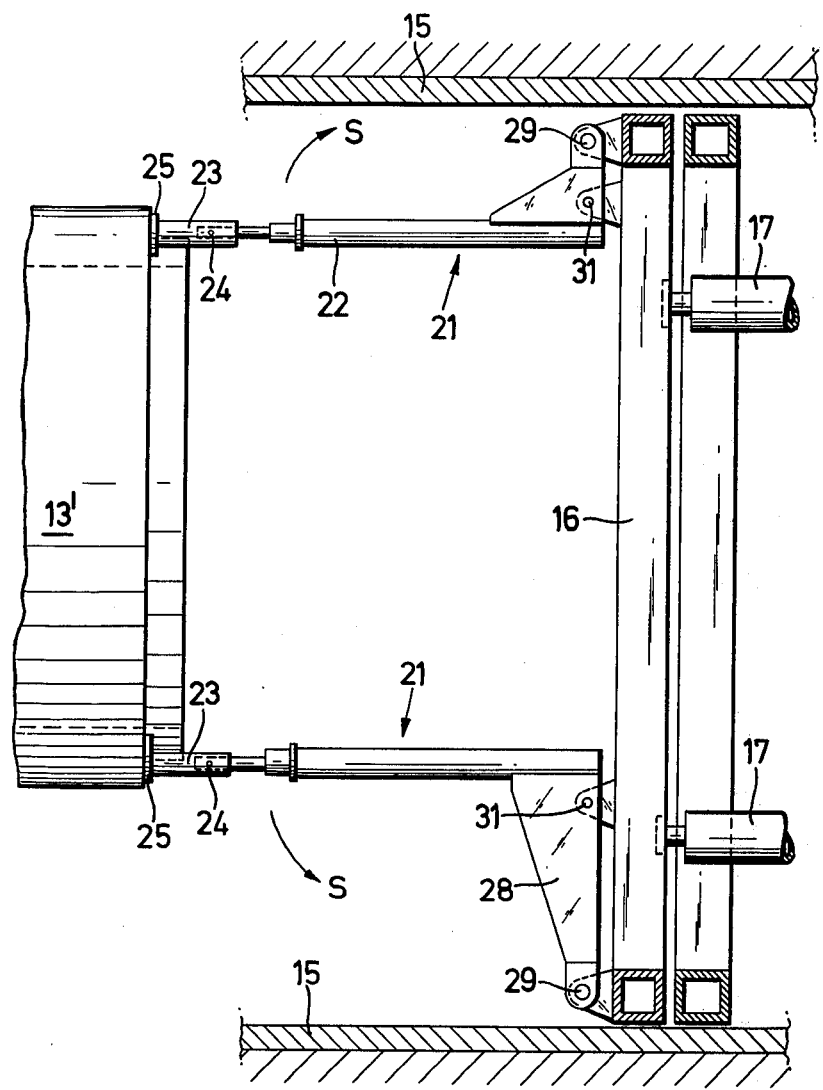
FIG. 5 is a plan view of the part of the apparatus depicted in FIGS. 3 and 4.

As shown in FIGS. 1 and 2 apparatus constructed in accordance with the invention is used to install a pipe-line underground. In the laying of the pipe-line in accordance with the invention, an open trench is excavated with the assistance of a crib-shield 11 and individual pipe lengths or sections 13 are laid in the trench end-to-end. The installed pipe sections 13 are subsequently covered by the in-filling of material as represented by 33. The crib-shield 11 has a framework which includes a support frame 14 which is open-topped and of generally U-shaped configuration. This frame 14 supports a plurality of elongate members in the form of cutter planks 15. These planks 15 have cutting edges at their front end adapted to penetrate the working end face 19 of the trench 11 and are arranged side-by-side to contact the floor and side walls of the trench 11. The planks 15 can be moved longitudinally in parallelism either individually or collectively or in groups in relation to the frame 15 and in the forward driving direction V. To effect the movement of the planks 15, inter alia, a plurality of double-acting hydraulic piston and cylinder units 17 are provided. These units 17 are connected between the frame 14 and a further movable rear frame 16. Locking means, such as a plurality of pins insertable into aligned bores, are provided for selectively connecting the plank or planks 15 to be moved with the frame 16. When the or each plank 15 to be moved is connected in this manner or otherwise with the frame 16 the units 17 can be retracted to draw up the frame 16 towards the frame 14 thereby advancing the plank or planks 15 in question. The frame 16 can then be released from the planks 15 and returned to its former position by extending the units 17. A new plank 15 or group of planks 15 can then be connected for movement with the frame 16 and the operation repeated. By successively moving the frame 16 back and forth the planks 15 can all be advanced. When it is necessary to advance the frame 14 the planks 15 are all connected with the frame 16 so that the frictional contact between the planks 15 and the side and floor walls of the trench enables the planks 15 and the frame 16 to act as an abutment for the units 17 which are extended to now urge the frame 14 in the direction of arrow V. The process of moving up the planks 15 can then be recommenced. As can be appreciated from the foregoing the crib-shield 11 supports the trench side walls and cuts into the end face 19 to advance the trench into the region denoted 10 as the planks 15 are moved up in the direction of arrow V. Material can be removed from the trench by any suitable method and by way of example a digging machine 20 is depicted in chain-dotted lines in FIG. 2.

As the crib-shield 11 is moved up in the direction of arrow V by a sufficient distance a new pipe section 13' can be lowered independently into the trench 11 behind the frame 16 as represented in FIG. 2. It is then necessary to connect the end of the pipe section 13' remote from the frame 16 with the facing end of the pipe section 13 previously installed. To achieve this connection the apparatus is provided with a thrust means which is omitted from FIG. 1 for reasons of clarity. As shown in FIGS. 2 to 5, the thrust means comprises two devices 21 which can engage on the nearmost facing end of the pipe section 13 below the central axis of the pipe section 13' and above the floor level. Each device 21 is composed of two elements 22, 23 with telescopic parts rigidly interconnected by means of a shear pin 24 to prevent damage. The provision of telescopic parts enables the length of the devices 21 to be varied according to the operating conditions and the shear pin 24 can be engageable in a set of aligned bores in these parts; each part having a series of such bores spaced-apart axially thereof. The outermost smaller element 23 has a head piece or plate 25 which is engageable directly on the end of the pipe section 13'. Usually the pipe sections 13,13' would be pre-fabricated concrete components and it is thus desirable to construct the head piece 25 from a relatively soft yieldable material, or else to construct the head piece 25 from a rigid plate having a soft yieldable layer on its outer face, so as to avoid damage to the pipe sections 13, 13'. Preferably the head pieces 25 also engage on the pipe section 13' over a reasonably large area.

Each device 21, or rather the element 22 thereof, is articulated to the frame 16. In the illustrated embodiment, the frame 16 is composed of hollow box-section girders and the devices 21 are pivotably connected to upstanding girders 26 of the frame 16 and detachably coupled to a horizontal floor girder 32 of the frame 16. More particularly, each element 22 is connected to a structure 27 composed of a horizontal plate-like arm or link 28 and a vertical plate-like arm or link 30. The arm 28 of each structure 27 is pivoted to brackets or lugs on the associated girder 26 with the aid of an upstanding pivot pin 29 and the arm 30 of each structure 27 is connected to the girder 32 via interengaging lugs and an upstanding removable locking pin 31. In the illustrated embodiment the arms 28 are of different lengths and the axis of the pipe section 13' is hence offset laterally from the centre of the crib shield 11.

The locking pins 31 are easily detachable and by removing these pins 31 the devices 21 can be pivoted about the pins 29 and swung laterally towards the trench side walls as shown by arrows in FIG. 3. With the devices 21 stowed in this manner the pipe section 13' can be lowered into the trench without hinderance. When the pipe section 13' has been placed into the trench, as shown in FIG. 2, the devices 21 can be pivoted about the pins 29 back to their operative or working position and the pins 31 can be re-located. The pipe sections 13, 13' preferably have mateable ends with socket-line recesses and projections, for example, and to achieve the desired connection, which may be a sealing connection, the entire frame 16 is moved in the reverse direction to arrow V by extending the units 17. The frame 16, which would be detached from the planks 15 then causes the devices 21 to transmit thrust force to the pipe section 13' to press the latter against the facing end of the pipe section 13. When the pipe sections 13,13' have been connected as desired, the pins 31 can be removed again to permit the devices 21 to be stowed. Then, as described hereinbefore, the shield 11 is used to advance the trench again until a fresh pipe section can be installed in the manner described.

We claim:

1. In an apparatus for use in driving a trench and for installing a pipe-line which is composed of pipe sections arranged end-to-end, said apparatus including an advanceable shield for excavating an open trench for receiving the individual pipe sections, the shield having a front frame which guides and supports a plurality of elongated members which themselves support the walls of the trench, the shield having a rear frame which is selectively locked to individual elongated members, ram means acting between the two frames for moving the rear frame relative to the front frame to cause selected elongated members to be moved forward lengthwise of the trench, the improvement therein comprising: thrust means for urging the forward-most pipe section rearwardly into telescopic engagement with the pipe-line, said thrust means coupled to and extending rearwardly from said rear frame, said thrust means including at least one thrust member selectively movable between a working position in lengthwise alignment with and abutment against the forward rim of the forward-most pipe section, and a storage position out of lengthwise alignment with and removed from abutment against the forward rim of the forward-most pipe section.

2. The improvement of claim 1 wherein said thrust means includes two thrust members, each said thrust member coupled at its forward end to said rear frame, and each said thrust member provided at its rearward end with a bearing surface means for abutment against a pipe section rim.

3. The improvement of claim 2 wherein said bearing surface means includes a bearing plate having a yieldable abutment surface.

4. The improvement of claim 2 wherein said two thrust members, in their working position, are positioned with their said bearing surface means in abutment against the lower semicircular periphery of the pipe section forward rim.

5. The improvement of claim 2 wherein each said thrust member has two bracing struts rigidly affixed to its forward end, said bracing struts being attached to said rear frame, said two bracing struts being oriented perpendicular to each other and to said thrust member.

6. The improvement of claim 5 wherein one of said bracing struts is attached to said rear frame by means of a hinge assembly, and the other one of said bracing struts is attached to said rear frame by means of a manually operable latch assembly, the other one of said bracing struts being latched in the working position, and being unlatched in the storage position.

7. The improvement of claim 1 wherein said thrust member includes adjustable means for varying the length of said thrust member.

8. The improvement of claim 7 wherein said thrust member includes two telescopically assembled portions, and said adjustable means includes a plurality of transversely aligned pairs of apertures in each said thrust member portion, and a shear pin inserted through four aligned apertures for selectively fixing the length of said thrust member.

9. The improvement of claim 1 wherein said thrust means is pivotally attached to said rear frame.

10. The improvement of claim 9 further including locking means for selectively locking said thrust means in its working position and in its storage position.

11. A method of driving a trench and for installing a pipe-line which is composed of pipe sections arranged end-to-end, said method comprising: driving an open trench by operating piston-cylinder ram means attached to the axially spaced-apart, relatively shiftable, front and rear frames of an advanceable shield, said frames guiding and supporting a plurality of elongated members which drive the trench and which support the walls of the trench; lowering individual pipe sections into the trench in axial advance of the pipe-line; and urging each individual pipe section rearwardly into telescopic engagement with the pipe-line by operating the piston-cylinder ram means attached to the rear frame of the advanceable shield, said rear frame carrying thrust members which extend rearwardly from the rear frame and are movable between a storage position and a working position in lengthwise alignment with and abutment against the forward rim of the forward-most pipe section, said piston-cylinder ram means operating to shift the rear frame forwardly to advance the elongated members to drive the trench, and rearwardly to press the thrust members in their working position against the individual pipe section to urge it into telescopic engagement with the pipe-line.

* * * * *